United States Patent [19]

Kirner

[11] 3,815,031

[45] June 4, 1974

[54] RECIRCULATING DELAY LINE DECODER-ENCODER

[75] Inventor: Ernest O. Kirner, Coral Springs, Fla.

[73] Assignee: The Bendix Corporation, Ft. Lauderdale, Fla.

[22] Filed: Dec. 12, 1972

[21] Appl. No.: 314,297

[52] U.S. Cl. .................... 328/56, 328/110, 328/117, 328/119

[51] Int. Cl. .......................................... H03k 5/159

[58] Field of Search ......... 328/56, 65, 110, 116–119

[56] References Cited

UNITED STATES PATENTS 3,092,830 6/1963 Clock et al. ...................... 328/56 X

*Primary Examiner*—John Zazworsky

*Attorney, Agent, or Firm*—W. G. Christoforo; Bruce L. Lamb

[57] ABSTRACT

A single delay line is used in an aircraft transponder for decoding interrogations and coding response thereto. The various delay line output tap circuits respond only to signals having a predetermined polarity and a predetermined amplitude. Decoding is accomplished when certain of these output taps respond while coding is accomplished when certain others of the output taps respond.

6 Claims, 2 Drawing Figures

RECIRCULATING DELAY LINE DECODER-ENCODER

BACKGROUND OF THE INVENTION

This invention relates to apparatus which uses a delay line and particularly to aircraft transponder apparatus which uses a single delay line for both decoding interrogations and coding responses thereto.

It has been the practice in the past to provide two separate delay lines in an aircraft transponder, one delay line for decoding interrogations and another for coding responses thereto. It has been proposed that a single delay line be used and time shared between the decoding and coding functions. This particular proposal recognizes the ability of a delay line to propagate both positive and negative pulses therethrough and uses pulses of one polarity, such as positive polarity, propagating therethrough to perform the decoding function and pulses of the opposite polarity, for example, negative polarity, propagating therethrough to perform the coding function. In this use of the delay line certain output taps which are used for decoding respond only to pulses of one polarity, for example, positive polarity while those output taps used for coding respond only to pulses of the opposite or, in this case, negative polarity. It should be noted that although only a single delay line has been proposed where two delay lines were required, the proposed single delay line must be at least as long as the longest of the two delay lines which it replaces.

SUMMARY OF THE INVENTION

The present invention is a further improvement over the aforementioned proposal and permits not only the use of a single delay line in place of the two delay lines used in the prior art but it also permits the single delay line to be generally one-half the length of the longest delay line it replaces. This is accomplished by providing pulses propagating therethrough not only of opposite polarities but also of differing amplitudes and providing delay line output taps which respond only to pulses of a predetermined polarity and a predetermined amplitude. In one embodiment of the invention the video signal corresponding to a received interrogation is standardized as to width and amplitude at a relatively low amplitude and applied simultaneously to coincidence gates and the delay line. The pulse propagates through the delay line, at the end of which the pulse is reversed in polarity and recirculated through the delay line. In this case, the delay line output taps used in the decoding function will respond only to signals having a relatively low amplitude and will reject signals having any amplitude above a predetermined threshold. In addition, where the delay line is $x$ time units long, those delay line output taps used for decoding pulses from zero to $x$ time units apart will respond only to pulses having the original pulse polarity while those delay line output taps used for decoding pulses between $x$ and $2x$ time units apart will respond only to pulses having the opposite polarity.

Those delay line output taps used to perform the coding function respond only to signals which exceed the aforementioned threshold. When a coincidence gate is satisfied indicating that a predetermined interrogation signal has been received and a response must be made, a pulse for coding is generated and standardized as to width and amplitude at an amplitude above the aforementioned threshold and propagated into the delay line. Since the pulse is above the aforementioned threshold, the delay line output taps used for decoding will not respond thereto while those delay line output taps used for coding will respond.

DESCRIPTION OF THE PREFERRED EMBODIMENT

The invention will be described as it is used in an aircraft transponder. However, it should be obvious as the description proceeds that the invention might be used in other suitable environments.

It is well known that an aircraft transponder must be capable of recognizing and responding to various coded interrogation signals transmitted by a ground station. At the present time each of these interrogations consists generally of a coded pair of pulses. For example, what is termed a Mode A interrogation is comprised of two pulses separated by an eight microsecond interval. A Mode C interrogation is comprised of two pulses separated by a twenty-one microsecond interval. In addition, the transponder must be able to suppress interrogations occurring on the ground station side lobes, this ability of the transponder being termed side lobe suppression. In order to suppress these side lobes the transponder must recognize a pair of pulses separated by a time interval of 2 microseconds. The means by which side lobe interrogation is suppressed are well known to those skilled in the art and will not be explained herein.

Figure 1:
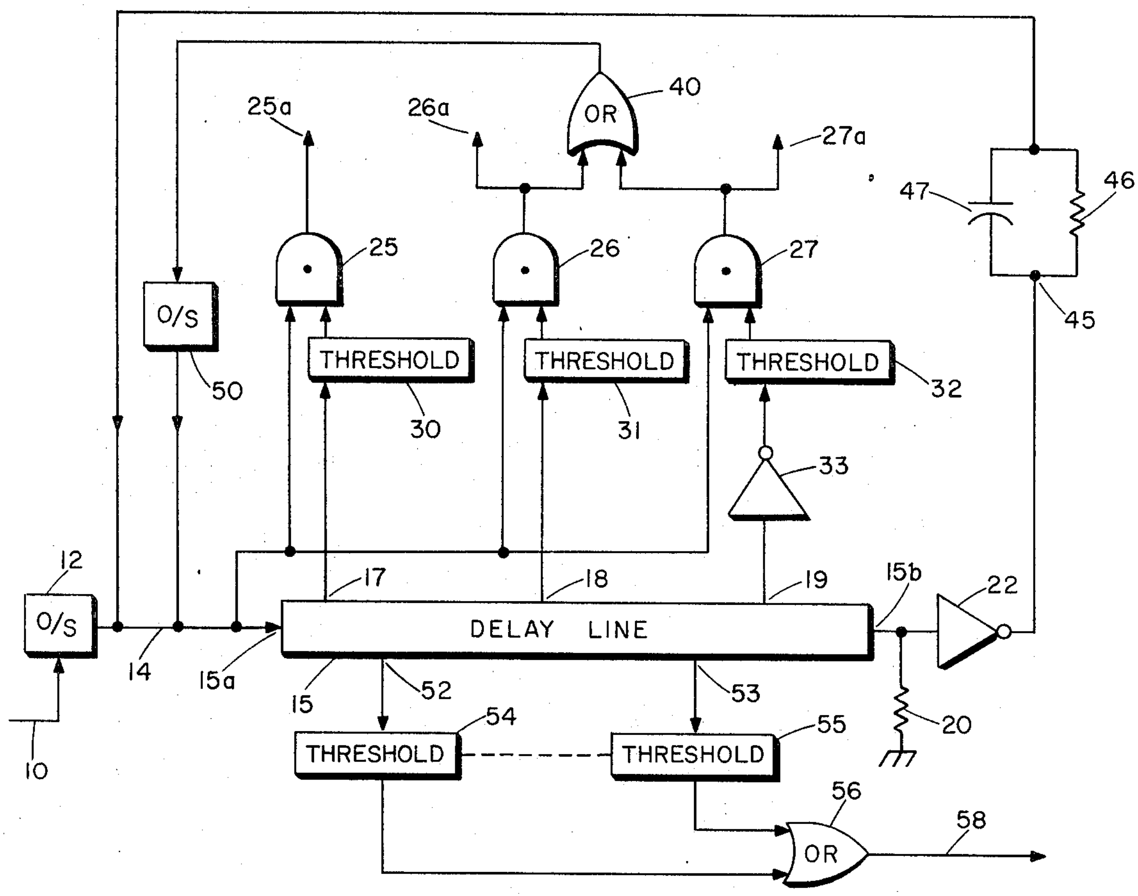
FIG. 1 is a modified block diagram of one embodiment of the invention.

Refer now to FIG. 1 which shows a delay line 15 which is a passive analog device. That is, the delay line characteristically requires no energy other than the input signal to operate and generally preserves the amplitude and polarity of a signal propagating therethrough. It should be noted that a delay line of the type here described will attenuate the amplitude of a signal propagating therethrough somewhat, however, the delay line attenuation per unit length of the delay line is quite easily ascertained and generally known to the system designer. Hence, given a standardized amplitude at the input to the delay line, the amplitude of the signal at the various output taps will be predictable and known. Series resistors of different values are usually employed to equalize the tap outputs. Delay line 15 includes input terminal **15*a* upon which signals to be propagated through the delay line are applied. Terminal 15*a* is connected via line 14 to the output terminal of one-shot 12. One-shot 12 is triggered by signals on line 10. The signals on line 10 are obtained from the receiver circuits of the transponder and are video signals which correspond to the interrogation signals received at the transponder from a ground station. In other words, the signals on line 10 will be comprised of a pair of pulses time-separated by 8 microseconds if a Mode A interrogation is received, will be separated by 21 microseconds if a Mode C interrogation is received, and will be separated by 2 microseconds if a side lobe interrogation has been received. One-shot 12 in response to a video pulse received from line 10 generates an output pulse, which in this embodiment is a positive-going pulse, standardized as to amplitude and as to width. For the purposes of this embodiment of the invention, it is assumed that the amplitude of the output pulses from one-shot 12 are relatively low and below a first predetermined threshold but high enough so that a pulse propagated through delay line 15** and thus attenuated thereby can still be detected at the decoding output taps to be described. In other words, it is assumed that no attenuation occurs as a pulse propagates through the delay line since the attenuation is known and can be provided for by the circuits connected to the various output taps.

The output pulses from one-shot 12 are not only applied to the delay line input terminal 15*a*, as previously described, but are also applied as one input to coincidence gates 25, 26 and 27. A second input to coincidence gate 25 is received from delay line output tap 17 through threshold circuit 30. In this particular embodiment, delay line output tap 17 is time-spaced 2 microseconds from delay line input terminal 15*a*, that is, a pulse applied at input terminal 15*a* appears at output tap 17 2 microseconds later. Threshold circuit 30 along with threshold circuits 31 and 32, to be described later, suitably comprise standard thresholding circuits which will permit the signal applied thereto to pass therethrough only if the signal is below a design threshold and, of course, is high enough to be detected. In this case, the design threshold is the aforementioned first predetermined threshold. In addition, thresholds 30, 31 and 32 are of the type which respond only to positive pulses. Thus, if a side lobe interrogation has appeared at line 10, two pulses of relatively low amplitude, that is, below the first aforementioned threshold, and separated by 2 microseconds will appear at line 14. Accordingly, the second of these pulses will appear simultaneously with the first of these pulses at the two inputs to coincidence circuit 25 so that gate 25 will open and the single pulse will appear at its output 25*a*. The use of signals such as these at line 25*a* in aircraft transponders are well known to those skilled in the art and its application will not be further described.

Coincidence gate 26 operates in a similar menner with one input thereto being received from line 14 and the second input thereto being received through threshold circuit 31 from delay line output tap 18. In this particular embodiment, delay line output tap 18 is time-separated from input terminal 15*a* by 8 microseconds. Accordingly, if a Mode A interrogation is received, pulses will appear simultaneously at the input terminals of gate 26 which will thereupon open to pass a single pulse to OR gate 40.

Coincidence gate 27 is similar to the other coincidence gates in that it receives the pulses on line 14. It differs from the other gates in that it is connected through threshold 32 and an inverter 33 to a delay line output tap, in this case output tap 19. Since, as aforementioned, the various thresholds 30, 31 and 32 respond only to positive pulses when pulses from one-shot 12 are positive a pulse propagating through delay line 15 the first time will be unable to cause threshold 32 to respond since the pulse is positive and is inverted by inverter 33 to produce a negative pulse at the output thereof.

Delay line 15 includes an output terminal 15b and a termination resistor 20 connected therebetween and ground. Resistor 20 terminates the delay line so that there is no reflection from the output thereof back into the line. Positive pulses which are passed through the delay line and issue at output terminal 15*b* are applied to the inverter amplifier and limiter 22. This inverter is able to accept only positive pulses, hence, pulses from one-shot 12 which are passed through the delay line for the first time are applied to inverter 22 wherein they are inverted, amplified and limited. These inverted pulses now pass through a standard speed-up network comprised of resistor 46 and capacitor 47 connected in parallel. The inverted pulses are then reapplied to line 14 whence they are once again entered into delay line 15 at input terminal 15*a*. Since these pulses are now inverted, thresholds 30 and 31 will not respond thereto. However, this inverted pulse at output tap 19 is reinverted by inverter 33 so that a positive-going pulse is applied to threshold 32 which thereupon responds. Delay line output tap 19, in this embodiment, is used to recognize a Mode C interrogation. It will be remembered that Mode C interrogations are comprised of a pair of pulses time separated by 21 microseconds. Thus, since the pulses to be effective at delay line output tap 19 must pass through the delay line twice, it is not necessary that tap 19 be time separated from input terminal 15*a* by the full 21 microseconds. In this particular case, delay line 15 was made 12.5 microseconds long. Accordingly, output tap 19 is time spaced 8.5 microseconds from input terminal 15*a*. If a Mode C interrogation is received, the first of the pulses will be applied to gate 27 through threshold 32 and inverter 33, while the second of the pulse pair will be applied simultaneously from line 14. Accordingly, gate 27 will open and a pulse will pass therethrough and through gate 40.

It should also be realized that the output signals from gates 26 and 27 which appear respectively at either line 26*a* or 27*a* and indicate the reception of a Mode A or Mode C interrogation are used by the transponder to respond as well known to those skilled in this art. The means by which a particular reply is made need not be and are not shown. However, in any event, should either a Mode A or Mode C interrogation be received, decoder OR gate 40 will generate an output pulse which is used to trigger one-shot 50. This latter one-shot produces an output pulse standardized as to duration and amplitude, where the amplitude of the output pulse is relatively high and greater than the aforementioned first threshold. The output from one-shot 50 is applied to delay line input terminal 15*a* via line 14 from whence the pulse is propagated through the delay line. As previously mentioned, thresholds 30, 31 and 32 respond only to positive pulses below the first threshold. Thus, these threshold circuits will not respond to the pulse now passing through the delay line. On the other hand, thresholds 54 and 55 are set to respond only to pulses above the first threshold. These thresholds are connected respectively to delay line output taps 52 and 53 which are the delay line coding output taps. Accordingly, thresholds 54 and 55 will generate outputs as the relatively high pulse propagates through the delay line, these output pulses being applied to OR gate 56 so that they pass therethrough serially onto line 58.

In the use of the transponder, it is required that a response be transmitted to an interrogation signal a fixed time period after the interrogation signal is decoded. The spacing between output tap 52 and input terminal 15*a* is correlated to this fixed time period. In addition, the response is related to the time interval between two pulses, this time interval being related to the distance between coding output terminal taps 52 and 53.

Figure 2:
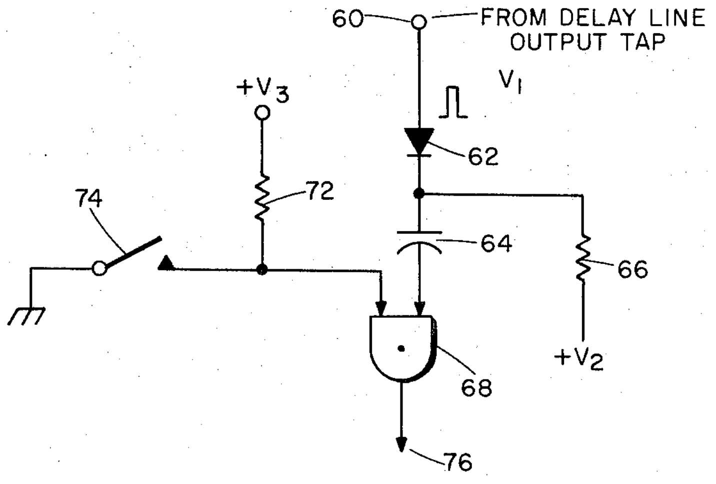
FIG. 2 is a modified block diagram of a threshold circuit suitable for use with the invention.

Refer now to FIG. 2 which illustrates a threshold which produces an output only if the input is above a predetermined amplitude. This type of threshold is suitable for use in the embodiment of FIG. 1 as threshold 54 or 55. In FIG. 2 a terminal 60 is connected to a proper delay line output terminal and receives the signals thereat. Terminal 60 is connected through diode 62 and capacitor 64 as one input to AND gate 68. The diode permits only pulses of a predetermined polarity, in this case positive, to pass therethrough. The junction between diode 62 and capacitor 64 is connected through resistor 66 to a d-c voltage level $+V_2$. Thus, where the pulse signal at terminal 60 is at a $V_1$ voltage level, the pulse can pass through diode 62 only if $$V_1 > V_2$$

$V_2$ thus provides the threshold.

The other input to gate 68 is connected through resistor 72 to a d-c voltage level $+V_3$ and is switchable by means of switch 74 to ground. With switch 74 open, a pulse $V_1$ greater than $V_2$ will produce a pulse output on line 76. If switch is closed gate 76 can produce no output. It should thus be obvious that switch 74 and the other like switches in similar thresholds permit a particular coded response to be generated.

Although only coding thresholds 54 and 55 are shown in FIG. 1, more coding thresholds similar thereto can be used to produce a desired coded response.

In known transponders the decoding of either a side lobe interrogation or Mode A or C interrogations acts to suppress the receiver portion of the transponder for a predetermined time period to prevent possible erroneous responses. Since the means for suppressing the receiver are well known it will not be described here. Referring to FIG. 1, with the receiver suppressed, no pulses can be generated by one-shot 12 during the coding period which generally coincides with the suppressed period and only the signal coding pulse from oneshot 50 will appear on line 14. In this case, none of the threshold circuits 30, 31 or 32 need suppress signals over a predetermined threshold since it is impossible for coincidence to occur at any of the gates 25, 26 or 27 during the coding period. In this case, threshold circuits 30, 31 and 32 can be eliminated since gates of known design suitable for use with the invention as gates 25, 26 and 27 will suppress signals of incorrect polarity.

Of course, if a particular use of the invention requires that pulses above a certain threshold be suppressed, the circuit of FIG. 2 can be used with the output on line 76 used in this instance to suppress the signal at the output tap from passing to the coincidence gate by connecting terminal 60 of FIG. 2 as one input to a further inhibited AND gate and using the signal on line 76 to inhibit the gate, with the gate output connected to its coincidence gate input.

Other modifications and alterations of this invention should now be obvious to one skilled in the art. For example, it might be desired that the coding pulse from one-shot 50 be a negative pulse. In that case, thresholds 54 and 55 would be designed to respond to negative pulses or alternatively would be provided with an inverter at their input to invert the negative pulse.

As a further example, a situation might arise where the time separation between the coded pulses, those pulses at output terminals 52 and 53, are separated in time greater than that available from one pass through the delay line. In that situation, it would be desirable that the coding pulse be recirculated through the delay line as was the case when the delay line was used for decoding. A parallel recirculating circuit can be provided which will discriminate the relatively high amplitude of the coding pulse and will invert it and recirculate it as inverted back into the delay line where it would then be detected at an output tap by a threshold which responds to the negative pulse of relatively high amplitude. These and other modifications and alterations should be obvious to those skilled in the art. Accordingly, the invention is not to be limited to the exact means shown in the embodiment but should be limited only by the true scope and spirit of the appended claims.

The invention claimed is:

1. The combination with a delay line having at least an input terminal and a plurality of output taps spaced along said delay line, comprising:

means for applying first signals of first polarity and within a predetermined amplitude range to said input terminal so that said first signals propagate through said delay line;

at least one uni-directional threshold means responsive only to signals of said first polarity and within said predetermined amplitude range and connected to receive signals at one of said output taps;

means for applying second signals of said first polarity and of amplitude greater than said predetermined amplitude range to said input terminal so that said second signals propagate through said delay line; and, at least a second uni-directional threshold means responsive only to signals of said first polarity and having an amplitude greater than said predetermined amplitude range, said second uni-directional threshold means being connected to receive signals at one of said output taps.

2. The combination of claim 1 wherein said delay line includes an output terminal upon which appear signals which have propagated through said delay line, and additionally comprising:

means for inverting the polarity of signals at said output terminal and for applying the signals so inverted to said input terminal for propagation through said delay line; and, at least one further uni-directional means responsive only to signals of opposite polarity than said first polarity and connected to receive signals at one of said output taps.

3. The combination of claim 1 wherein said delay line includes an output terminal upon which appear signals which have propagated through said delay line, and additionally comprising:

a non-reflecting termination connected at said output terminal;

means for inverting the polarity of signals of said first polarity which appear at said output terminal and for applying the signals so inverted to said input terminal for propagation through said delay line; and, at least one further uni-directional means responsive only to signals of opposite polarity than said first polarity and connected to receive signals at one of said output taps.

4. Apparatus comprising:

a delay line including an input terminal, an output terminal and output taps spaced along said delay line;

at least one coincident means for generating an output pulse within a first predetermined amplitude range upon simultaneous application of pulses thereto;

means for applying groups of spaced pulses of a first polarity and within a second predetermined amplitude range to said input terminal so that said spaced pulses propagate through said delay line, and for applying said spaced pulses to said at least one coincident means;

a non-reflecting termination connected to said output terminal;

means for inverting the polarity of signals of said first polarity at said output terminal while rejecting signals of polarity opposite to said first polarity;

means for applying said signals as inverted to input terminal for propagation through said delay line;

at least one uni-directional means connected to one of said output taps and responsive only to pulses thereat of inverted polarity and having an amplitude within said second predetermined amplitude range for conducting a pulse to said coincident means;

means for communicating pulses generated by said coincident means to said delay line for propagation therethrough; and, at least a second uni-directional means connected to one of said output taps and responsive only to signals thereat which are within said first predetermined amplitude range.

5. The apparatus of claim 4 wherein no part of said first predetermined amplitude range coincides with any part of said second predetermined amplitude range.

6. The apparatus of claim 5 with additionally:

a second coincident means for generating an output pulse within said first predetermined amplitude range upon simultaneous application of pulses thereto, said groups of spaced pulses being applied also to said second coincident means;

at least a further uni-directional means connected to one of said output taps and responsive to signals thereat of said first polarity which are within said second predetermined amplitude range for conducting a pulse to said second coincident means; and, means for communicating pulses generated by said second coincident means to said delay line for propagation therethrough.

* * * * *